(12) United States Patent
Song et al.

(10) Patent No.: US 9,877,030 B2
(45) Date of Patent: Jan. 23, 2018

(54) APPARATUS AND METHOD FOR ENCODING/DECODING ADDITIONAL INTRA-INFORMATION

(71) Applicant: SK TELECOM CO., LTD., Seoul (KR)

(72) Inventors: Jinhan Song, Seoul (KR); Jeongyeon Lim, Seongnam-si (KR); Yung Ho Choi, Anyang Si (KR); Yonggoo Kim, Seoul (KR); Yoonsik Choe, Goyang-si (KR)

(73) Assignee: SK TELECOM CO., LTD., Seoul (KR)

( * ) Notice: Subject to any disclaimer, the term of this patent is extended or adjusted under 35 U.S.C. 154(b) by 698 days.

(21) Appl. No.: 13/939,700

(22) Filed: Jul. 11, 2013

(65) Prior Publication Data
US 2013/0294509 A1 Nov. 7, 2013

Related U.S. Application Data

(63) Continuation of application No. PCT/KR2012/000266, filed on Jan. 11, 2012.

(30) Foreign Application Priority Data

Jan. 11, 2011 (KR) .................. 10-2011-0002796

(51) Int. Cl.
*H04N 19/157* (2014.01)
*H04N 19/159* (2014.01)
(Continued)

(52) U.S. Cl.
CPC .......... *H04N 19/157* (2014.11); *H04N 19/13* (2014.11); *H04N 19/159* (2014.11); *H04N 19/176* (2014.11); *H04N 19/463* (2014.11)

(58) Field of Classification Search
None
See application file for complete search history.

(56) References Cited

U.S. PATENT DOCUMENTS 6,519,287 B1 * 2/2003 Hawkins ............... H04N 19/51
375/240.16
2008/0117971 A1 5/2008 Ramachandran et al.
(Continued)

FOREIGN PATENT DOCUMENTS

CN 101267562 A 9/2008
CN 101325710 A 12/2008
(Continued)

OTHER PUBLICATIONS

International Search Report dated Sep. 24, 2012 for PCT/KR2012/000266.
(Continued)

*Primary Examiner* — Mohammed Jebari
(74) *Attorney, Agent, or Firm* — Hauptman Ham, LLP

(57) ABSTRACT

The present disclosure provides an apparatus for encoding additional intra-information includes an intra prediction mode selecting unit for performing an intra prediction by applying at least one of one or more predetermined types of partitions and one or more prediction modes with respect to a coding unit, and for selecting at least one of a partition among the one or more types of partitions and a prediction mode among the one or more prediction modes; a partitioning and prediction mode table lookup unit for looking up a table, and for generating a table hit signal if the table has at least one of a partition corresponding to the selected partition and a prediction mode corresponding to the selected prediction mode; and an entropy encoding unit for performing an encoding based on the table, if the table hit signal is received.

12 Claims, 10 Drawing Sheets

| Index | Partitioning Mode String | | Number of Adoptions |
|---|---|---|---|
| 1 | 1 M2 M3 1 M2 | M12 M23 M12 M14 | 12 |
| ⋮ | ⋮ | ⋮ | ⋮ |
| N-1 | 1 M2 1 M2 1 M3 | M3 M4 M12 M 15 M12 M7 M5 M14 | 1 |
| N | 1 M2 M3 M2 1 | M12 M23 M12 M14 | 1 |

(51) Int. Cl.
*H04N 19/176* (2014.01)
*H04N 19/13* (2014.01)
*H04N 19/463* (2014.01)

(56) References Cited

U.S. PATENT DOCUMENTS

| | | | | |
|---|---|---|---|---|
| 2009/0087110 A1* | 4/2009 | Tourapis | H04N 19/176 | 382/238 |
| 2010/0054616 A1* | 3/2010 | Kim | H04N 19/176 | 382/238 |
| 2010/0296581 A1* | 11/2010 | Metoevi | H04N 19/00472 | 375/240.16 |
| 2011/0038415 A1* | 2/2011 | Min | H04N 19/115 | 375/240.12 |
| 2011/0103475 A1* | 5/2011 | Alshina | H04N 19/13 | 375/240.12 |
| 2011/0182361 A1* | 7/2011 | Nakamura | H03M 7/42 | 375/240.16 |
| 2011/0249721 A1* | 10/2011 | Karczewicz | H04N 19/159 | 375/240.02 |
| 2011/0310976 A1* | 12/2011 | Wang | H04N 19/176 | 375/240.24 |
| 2012/0082224 A1* | 4/2012 | Van Der Auwera | H04N 19/176 | 375/240.12 |
| 2012/0106629 A1* | 5/2012 | Zheng | H04N 19/176 | 375/240.02 |
| 2012/0128064 A1* | 5/2012 | Sato | H04N 19/70 | 375/240.03 |
| 2012/0128067 A1* | 5/2012 | Liu | H04N 19/159 | 375/240.12 |
| 2012/0177113 A1* | 7/2012 | Guo | H04N 19/593 | 375/240.12 |
| 2012/0269274 A1* | 10/2012 | Kim | H04N 19/176 | 375/240.24 |
| 2012/0314766 A1* | 12/2012 | Chien | H04N 19/176 | 375/240.12 |
| 2013/0142259 A1* | 6/2013 | Lim | H04N 19/00545 | 375/240.12 |
| 2013/0163664 A1* | 6/2013 | Guo | H04N 19/00793 | 375/240.12 |
| 2014/0140404 A1* | 5/2014 | Liu | H04N 19/00024 | 375/240.12 |
| 2014/0161178 A1 | 6/2014 | Young et al. | | |

FOREIGN PATENT DOCUMENTS

| | | |
|---|---|---|
| JP | 2006279374 | 10/2006 |
| KR | 10-2003-0061754 A | 7/2003 |
| KR | 1020090075608 | 7/2009 |
| KR | 1020090103674 | 10/2009 |
| WO | 2010002214 A2 | 7/2010 |
| WO | 2011/002504 A1 | 1/2011 |

OTHER PUBLICATIONS

Khalid Sayood; "Introduction to Data Compression—Third Edition", 2006, pp. 1-680, Morgan Kaufmann Publishers, San Francisco.

Korean Office Action dated Jun. 19, 2017 from KIPO in connection with the counterpart Korean Patent Application No. 10-2011-0002796.

* cited by examiner

FIG. 3

| Index | Partitioning Mode String | | Number of Adoptions |
|---|---|---|---|
| 1 | 1 M2 M3 1 M2 | M12 M23 M12 M14 | 12 |
| ⋮ | ⋮ | | ⋮ |
| N-1 | 1 M2 1 M2 1 M3 | M3 M4 M12 M 15 M12 M7 M5 M14 | 1 |
| N | 1 M2 M3 M2 1 | M12 M23 M12 M14 | 1 |

*FIG. 5*

Partitioning Mode Encoding Semantic

Partitioning Mode Flag

If (Partitioning Mode Flag) {

Layer Num;

Partitioning Mode Table Index

APPARATUS AND METHOD FOR ENCODING/DECODING ADDITIONAL INTRA-INFORMATION

CROSS-REFERENCE TO RELATED APPLICATION

The instant application is a continuation of International Patent Application No. PCT/KR2012/000266, filed Jan. 11, 2012, which is based on and claims priority to Korean Patent Application No. 10-2011-0002796, filed on Jan. 11, 2011. The disclosures of the above-listed applications are hereby incorporated by reference herein in their entirety.

FIELD

The present disclosure relates to an apparatus and a method of encoding/decoding additional intra-information that can adaptively decrease the amount of information at the time of encoding/decoding additional information.

BACKGROUND

The statements in this section merely provide background information related to the present disclosure and may not constitute prior art.

In an apparatus for compressing video data, intra encoding is performed in a way to effectively compress, through a transform technique, quantization and entropy coding processes, residual signals obtained by effectively removing spatial redundancy out of frames or blocks.

Representative intra coding methods include JPEG (Joint Photographic coding Experts Group) which is a compression method based on block-based discrete cosine transform (DCT) and JPEG2000 with an enhanced encoding effectiveness by a wavelet-based arithmetic coding scheme. Recently, it is known to the inventor(s) that the performance of intra encoding method through direction-based extrapolation prediction of H.264/AVC is most superior.

The intra encoding through the direction-based extrapolation prediction of H.264/AVC performs an extrapolation prediction by using pixels on the left and upper portions (A~M) in which encoding/decoding is completed based on the 9 directions including DC prediction (Mode 2) as illustrated in FIG. 1. That is, the extrapolation prediction of a pixel value in a block is performed by way of filling the pixel with values of the pixels in the left and upper portions according to the predicted direction. For example, in Mode 0, since the extrapolation prediction is performed in a vertical direction, the 4×4 block in FIG. 1 is filled with the values of A, B, C, D which are pixels in the upper portion in a direction of the arrows.

The inventor(s) has noted that in order to support a super-high resolution, there have been proposals for various block partitioning methods and encoding methods supporting intra prediction modes in various directions. In this case, the inventor(s) has experienced that a higher compression rate can be achieved by performing intra prediction to finer images, but not without incurring additional information for decoding the same, that is, an amount of signals such as a block partitioning method and an intra prediction mode, which makes it difficult to enhance the overall compression rate. The inventor(s) has, therefore, experienced that in order to achieve the higher compression rate, it is possible to reduce the total encoding bit amount by eliminating the repetitive elements of the additional information.

SUMMARY

In accordance with some embodiments of the present disclosure, an apparatus for encoding additional intra-information comprises an intra prediction mode selecting unit, a partitioning and prediction mode table lookup unit, and an entropy encoding unit. The intra prediction mode selecting unit is configured to perform an intra prediction by applying at least one of (i) one or more predetermined types of partitions and (ii) one or more prediction modes with respect to a coding unit, and select at least one of (a) a partition among the one or more types of partitions and (b) a prediction mode among the one or more prediction modes The partitioning and prediction mode table lookup unit is configured to look up a table based on at least one of the selected partition and the selected prediction mode, and generate a table hit signal if the table has at least one of (1) a partition corresponding to the selected partition and (2) a prediction mode corresponding to the selected prediction mode. And the entropy encoding unit is configured to perform an encoding based on the table, if the table hit signal is received from the partitioning and prediction mode table lookup unit.

In accordance with some embodiments of the present disclosure, an apparatus for decoding additional intra-information comprises an entropy decoding unit, a partitioning and prediction mode table lookup and parsing unit, and an intra decoding unit. The entropy decoding unit is configured to perform a decoding based on a bitstream. The partitioning and prediction mode table lookup and parsing unit is configured to look up and parse a table based on a signal decoded by the entropy decoding unit and correspondingly generate a partitioning and prediction mode string. And the intra decoding unit is configured to perform an intra-mode decoding based on the generated partitioning and prediction mode string.

BRIEF DESCRIPTION OF DRAWINGS

FIG. 3 is an exemplary diagram of a structure of a partitioning block of a coding unit and an intra encoding mode pattern of each sub-block;

FIG. 5 is an exemplary diagram of a partitioning and prediction mode table;

FIG. 7 is an exemplary diagram of a syntax for a partitioning mode encoding;

DETAILED DESCRIPTION

The present disclosure relates to effectively encode and/or decode additional information (e.g., intra-frame information) due to ever-increasing image size and resolution in video data compression apparatuses and various methods of partitioning coding blocks, and provides an apparatus and a method of encoding and/or decoding the additional information (e.g., intra-frame information) that can adaptively decrease the amount of information at the time of encoding/decoding additional information. At least one aspect of the present disclosure is to provide an apparatus and a method of encoding/decoding additional intra-information that can adaptively decrease an information amount at the time of encoding additional information by effectively managing partitioning information and prediction mode information patterns of previous blocks with a partitioning and prediction mode table.

A video may be a series of pictures, and each picture may be divided into predetermined domains such as frames or blocks. When a domain of the video is divided into blocks, the divided blocks may be classified into intra blocks and inter blocks according to an encoding method. The intra block is a block encoded through intra prediction coding. The intra prediction coding is a method of generating a prediction block by predicting a pixel of the current block by using pixels of the blocks reconstructed through encoding and decoding in the current picture in which the current encoding is performed, and encoding a difference value with respect to the pixel of the current block. The inter block is a block encoded through inter prediction coding. The inter prediction coding is a method of generating prediction block by predicting the current block in the current picture with reference to at least one past picture or future picture, and encoding a difference value with respect to the current block. Here, a frame referenced to encode or decode the current picture is referred to as a reference frame.

Hereinafter, an apparatus and a method for encoding/decoding additional intra-information according to at least one embodiment of the present disclosure will be described in detail with reference to the accompanying drawings.

Figure 1:
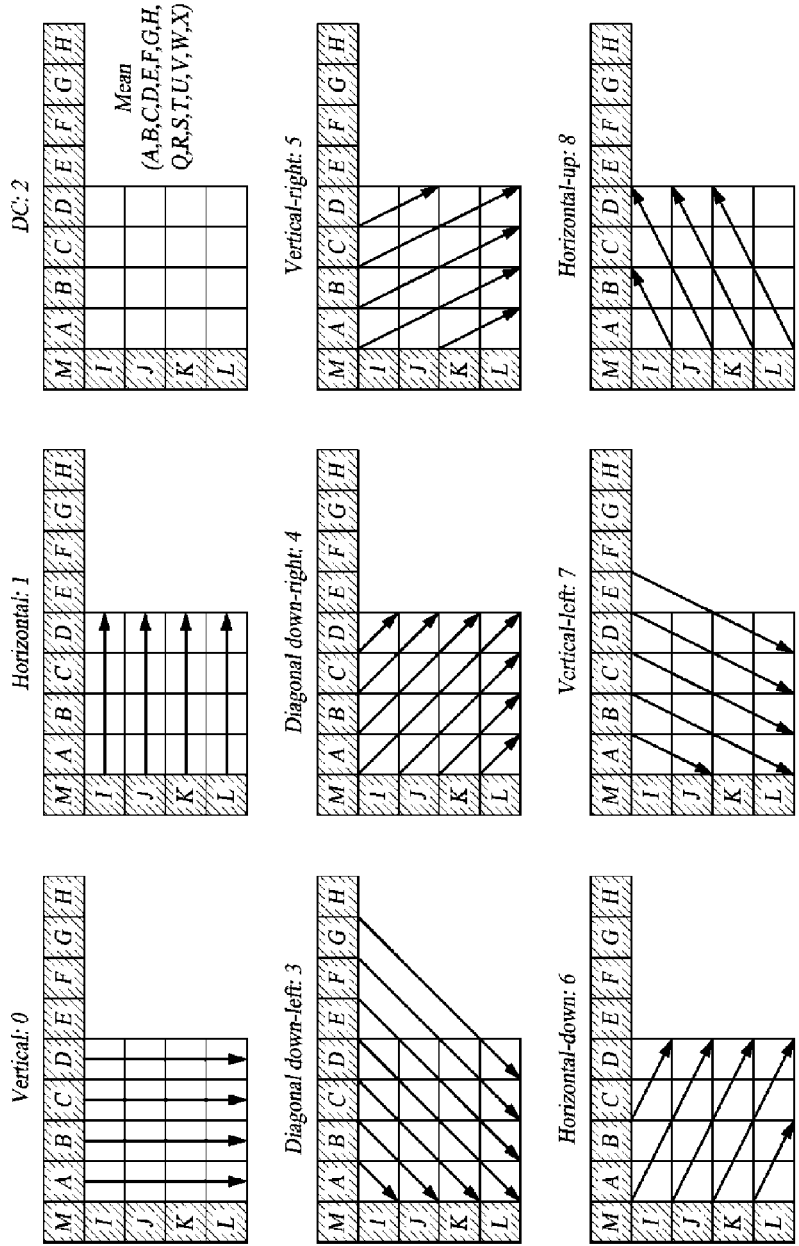
FIG. 1 is a diagram of an intra prediction mode according to H.264.
Figure 2:
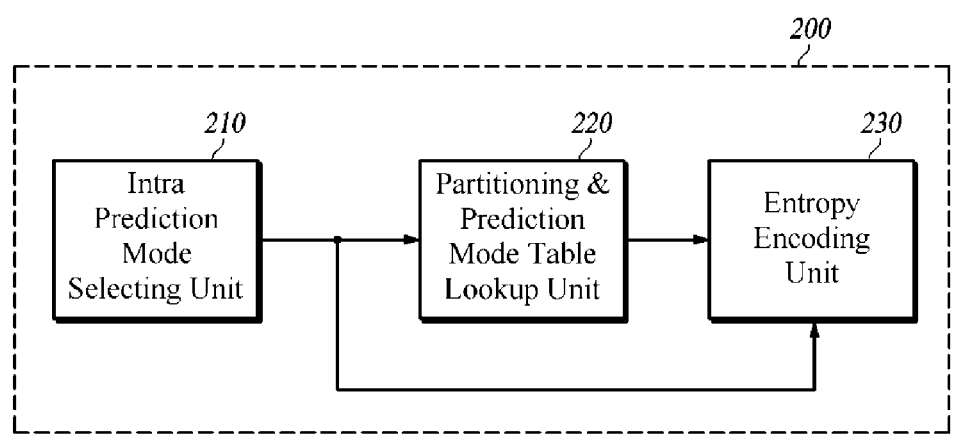
FIG. 2 is a schematic diagram of an additional intra-information encoding apparatus according to at least one embodiment of the present disclosure.

FIG. 2 is a schematic diagram of an additional intra-information encoding apparatus according to at least one embodiment of the present disclosure. With reference to FIG. 2, an additional intra-information encoding apparatus 200 according to at least one embodiment includes an intra prediction mode selecting unit 210, a partitioning and prediction mode table lookup unit 220, and an entropy encoding unit 230. Other components of the additional intra-information encoding apparatus 200, such as the intra prediction mode selecting unit 210, the partitioning and prediction mode table lookup unit 220, and the entropy encoding unit 230 are implemented by one or more processors and/or application-specific integrated circuits (ASICs).

The intra prediction mode selecting unit 210 performs intra prediction by applying various predetermined types of partitions and a plurality of prediction modes with respect to a coding unit. The intra prediction mode selecting unit 210 selects an optimal partition and an optimal prediction mode by calculating encoding costs with respect to each applied combination of partitions and prediction modes, and makes a string format expression of patterns of the selected partitions and the selected prediction modes.

The partitioning and prediction mode table lookup unit 220 lookups a partitioning and prediction mode table (herein after "the table") based on the partition and the prediction mode selected by the intra prediction mode selecting unit, and generates a table hit signal if the table has a corresponding partition. At this point, the partitioning and prediction mode table lookup unit 220 expresses the block partitioning and mode pattern information with strings and stores the block partitioning and mode pattern information in the string format into a table. Further, the partitioning and prediction mode table lookup unit 220 may store the block partitioning and mode pattern information into different tables according to the split depths of partitioning of the coding unit.

Figure 3:
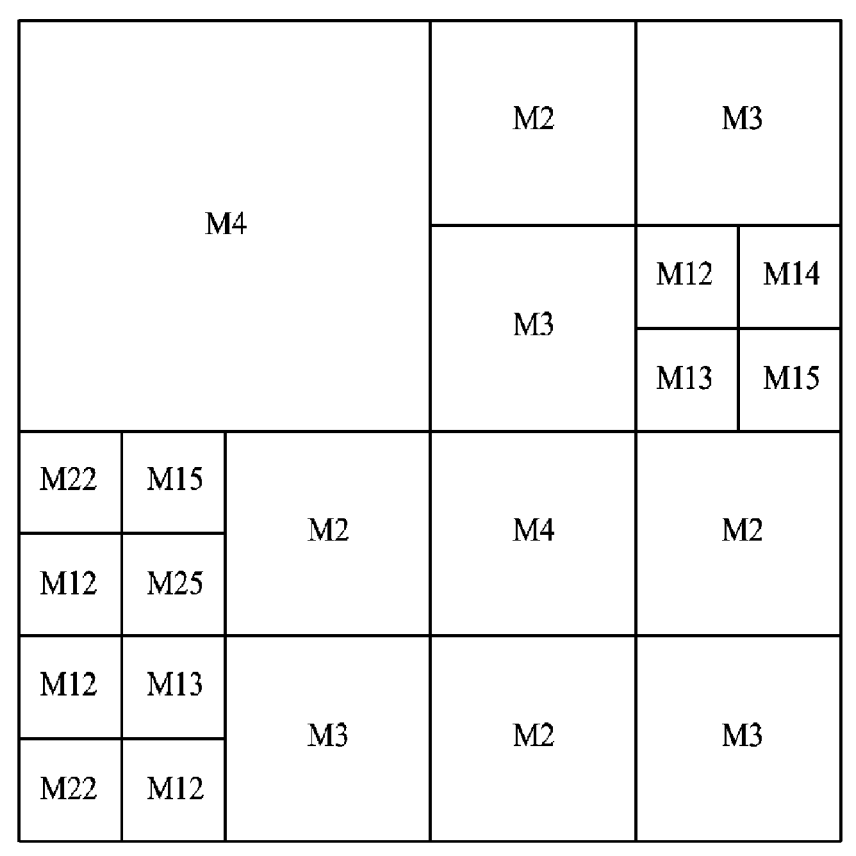
Figure 4:
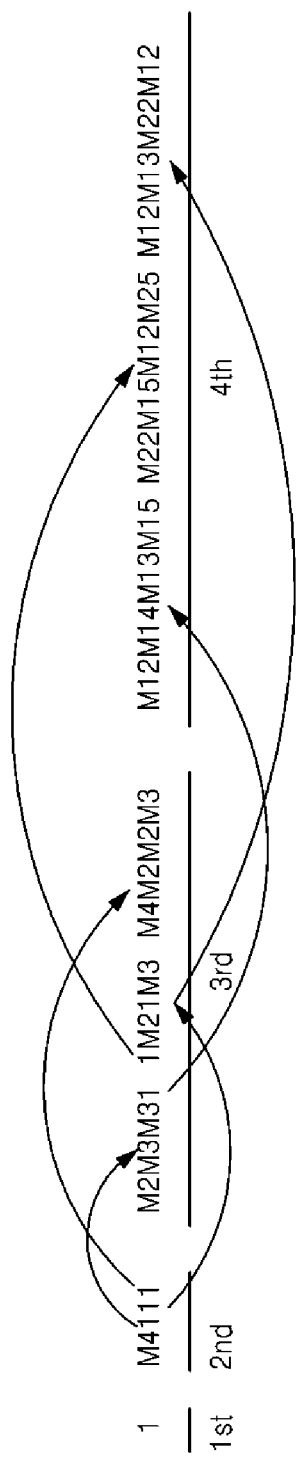
FIG. 4 is an exemplary diagram of expressing the coding unit of FIG. 3 with strings.

If it is assumed that, according to at least one embodiment of the present disclosure, blocks of the coding unit are partitioned as illustrated in FIG. 3, the string of blocks of the coding unit may be expressed as illustrated in FIG. 4. Here, the partitioning and mode string comprises one or more split flags (or partitioning flags) and one or more intra encoding modes. First, if the most significant coding unit (the biggest block in FIG. 3) is split into 4 sub-blocks, the first bit of the string (that is, a split flag) is set as "1" as illustrated in FIG. 4. If the first bit is "0", it means that the coding unit is coded without partitioning. This is followed by an intra encoding mode (i.e., an intra prediction modes).

In 'Mx' shown in FIGS. 3 and 4, 'x' right after 'M' refers to an intra encoding mode of the corresponding block. If a block is partitioned, the block has 4 sub-blocks shown in FIG. 4. At this point, the first bit of the string is set and the structure and mode information of the sub-blocks are indicated in the second bar of the string. For example, in FIG. 4, 'M4111' indicates that the first sub-block is not partitioned and coded with an intra mode 4 (M4) and that the second to fourth sub-block is partitioned. In this manner, only when partitioning is performed, the next part of the string in FIG. 4 can be assigned bits for an encoding mode of the corresponding sub-block and information on whether to do partitioning further or not.

Figure 6:
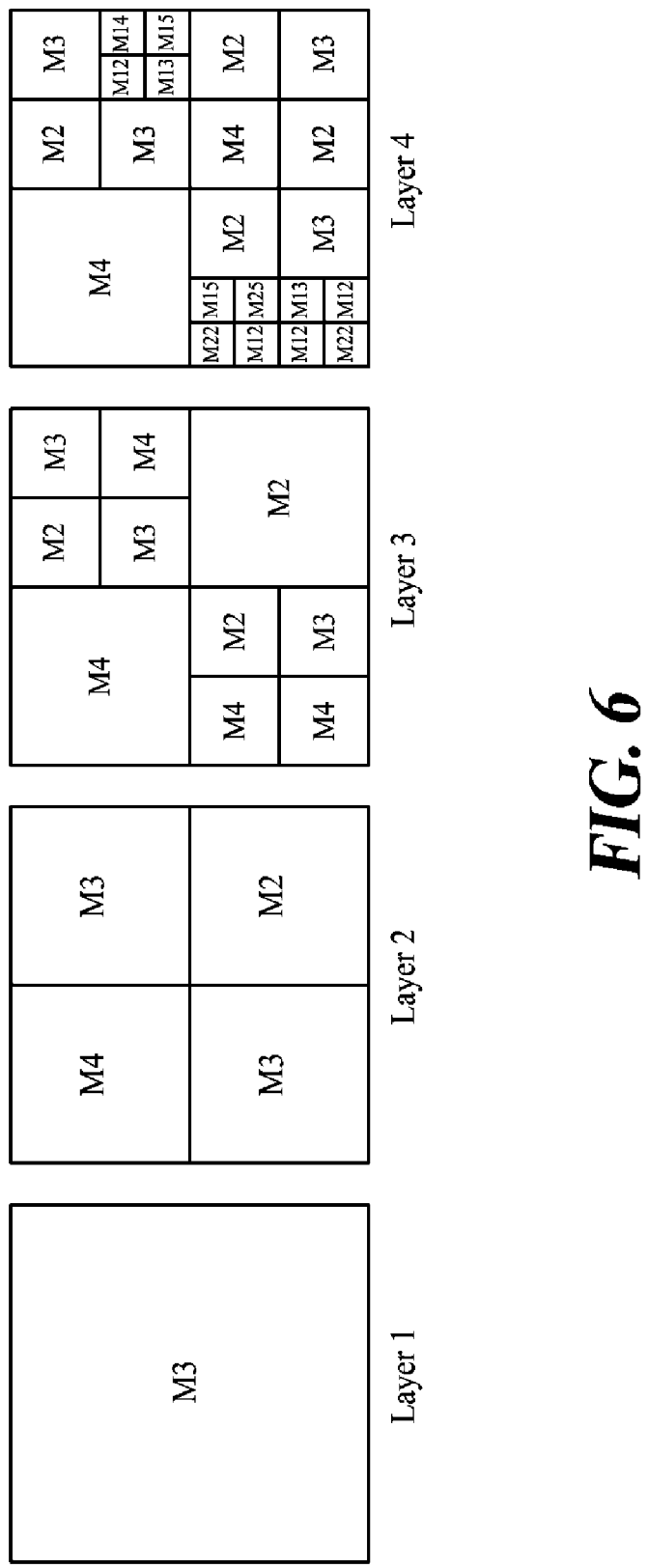
FIG. 6 is a diagram of examples of various block partitioning layers.

On the second bar in FIG. 4, '1' next to 'M4' in 'M4111' indicates that the second sub-block is partitioned and this fact is indicated as 'M2M3M31' at the first part of the third bar. The meaning of the indication (i.e., 'M2M3M31') is the same as described above. Specifically, the indication, 'M2M3M31' indicates that the first to third blocks are coded with M2, M3, and M3, respectively, and the fourth sub-block (i.e., herein the fourth sub-block indicated by '1' next to 'M3' in 'M2M3M31') is partitioned. All the encoding modes of the sub-block are indicated in this manner as a partitioning and mode string. The block partitioning and mode pattern information indicated in this manner can be stored in independent tables corresponding to respective split depths as with the partitioning illustrated in FIG. 6. For example, partitioning and mode pattern information on the blocks of the coding units which are not encoded without partitioning is stored in a table of Layer 1, partitioning and mode pattern information on the blocks which are partitioned once is stored in Layer 2, partitioning and mode pattern information on the blocks which are partitioned up to twice is stored in Layer 3, and partitioning and mode pattern information on the blocks which are partitioned up to three times is stored in a table of Layer 4. In this manner, different pieces of information on blocks having different partitioning layers are stored in different tables, because the image characteristics relate to the number of partitioning layers (split depth).

Each partitioning and mode table has k entries, and the respective entries may store the most frequently coded strings among partitioning and mode strings of already coded blocks and the number of the recently encoded blocks of the coding unit having the structure of each string.

If a table hit signal is received from the partitioning and prediction mode table lookup unit 220, the entropy encoding unit 230 performs entropy encoding based on the table as shown in FIG. 5. In this case, if the table hit signal is received from the partitioning and prediction mode table lookup unit 220, the entropy encoding unit 230 encodes an index corresponding to the table. That is, when coding additional information determined at the time of performing intra prediction encoding of blocks by the entropy encoding unit 230, if the content of the additional information is identical to the content of the table, information on intra encoding patterns and information on partitioning tree structures both managed by the tables can dispense with encoding that additional information and instead encode and transmit a much smaller signal, that is an index of the table to a decoder where the image is reconstructed.

At this point, in order that the decoder normally reconstructs the image, the decoder has the same table as the encoder. Therefore, if the content of the table of the encoder is updated, the table of the decoder is to be updated in a synchronized manner. Both of the encoder and the decoder may update the number of adoptions of the partitioning mode string already existing in the table without further additional information, since the encoder and the decoder know the number of times each structure is used referring to the content of the transmitted partitioning mode string. However, if a new string is attached to the table, the encoder informs the decoder that the new string is added to the table of the partitioning and mode string of the current block by transmitting a new string attachment flag signal and the new string to the decoder, so that the table in the decoder can also be properly updated. When the new string is attached, it is a principle that the new string replaces the least adopted string.

FIG. 7 is syntax for a partitioning mode encoding according to at least one embodiment of the present disclosure. If the partitioning and intra mode pattern of the current block of the coding unit is identical to one string in the partitioning and mode table, the syntax can use a partitioning and prediction mode table flag (i.e., "Partitioning Mode Flag" in FIG. 7) that informs whether or not to use the table, among encoding additional information signals. If the intra prediction coding additional information is not identical to the table history information, the intra prediction coding additional information resets the flag to "0" and encodes all the additional information. Meanwhile, if the intra prediction coding additional information is identical to the table history information, the intra prediction coding additional information sets the flag to "1" and encodes and transmits only the number of table layers and the index value of the table.

Figure 8:
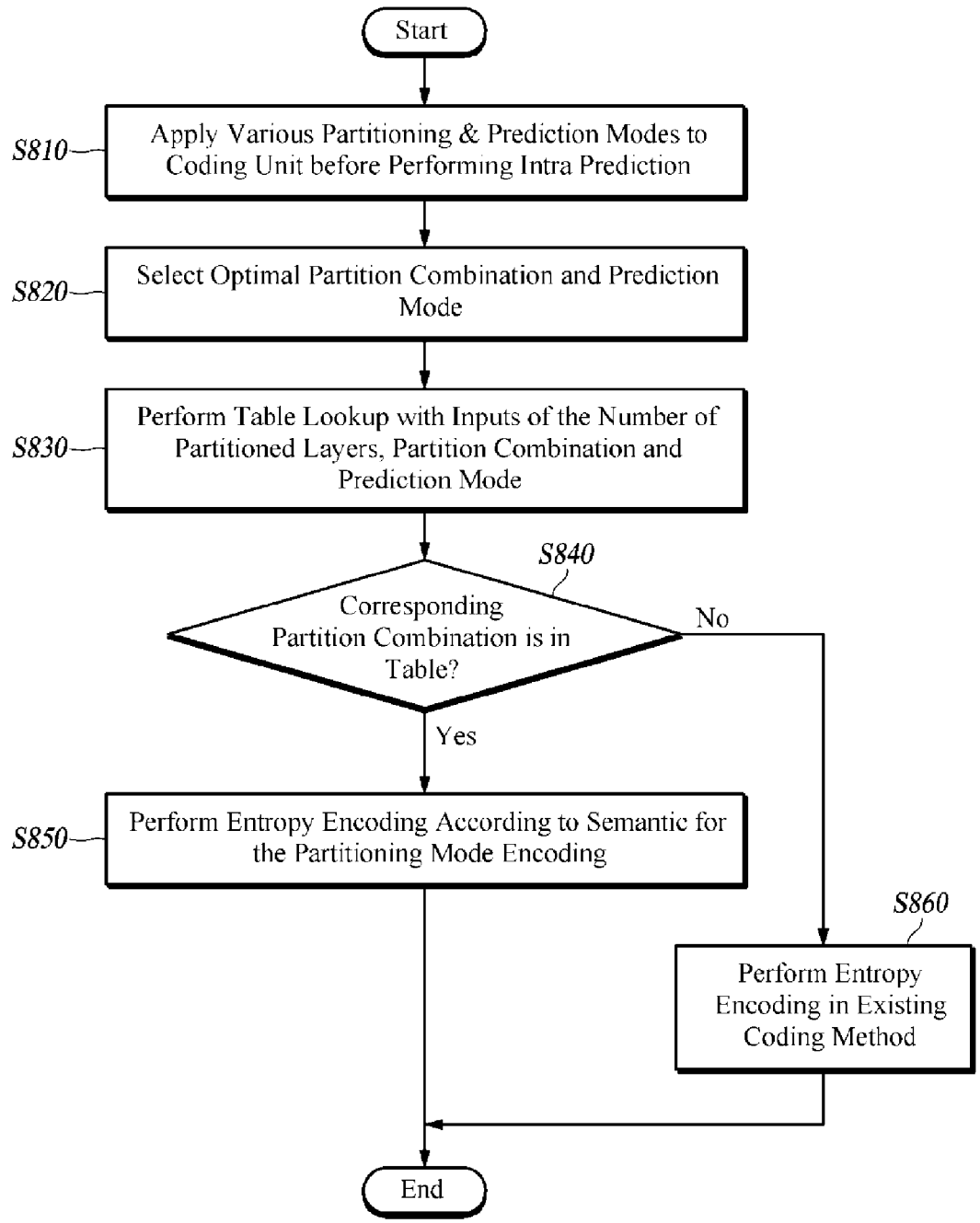
FIG. 8 is a flowchart of method for an additional intra-information encoding according to at least one embodiment of the present disclosure.

FIG. 8 is a flowchart of a method for encoding additional intra-information according to at least one embodiment of the present disclosure.

With reference to FIG. 8, the intra prediction mode selecting unit 210 performs intra prediction by applying various predetermined kinds of partitions and prediction modes with respect to the coding unit (S810). In addition, the intra prediction mode selecting unit 210 calculates encoding costs with respect to each applied combination of partitions and prediction modes and selects an optimal partition among one or more combination of partitions and an optimal prediction mode among one or more prediction modes (S820). For example, each of the optimal partition and the optimal prediction mode is selected in consideration with encoding costs (e.g., lower in encoding costs than other combination of partitions and/or other prediction modes).

The partitioning and prediction mode table lookup unit 220 performs a table lookup through a partitioning and prediction mode table based on the partition and the prediction mode selected by the intra prediction mode selecting unit (S830). If the partitioning and prediction mode table has a corresponding partition (S840), the partitioning and prediction mode table lookup unit 220 generates a table hit signal.

If a table hit signal is received from the partitioning and prediction mode table lookup unit 220, the entropy encoding unit 230 performs an entropy encoding based on the partitioning and prediction mode table. In this case, if the table hit signal is received from the partitioning and prediction mode table lookup unit 220, the entropy encoding unit 230 performs an entropy encoding to a corresponding index of the partitioning and prediction mode table according to the semantic for partitioning mode encoding (S850). If the partitioning and prediction mode table does not have a partition corresponding to the optimal partition and the optimal prediction mode selected by the intra prediction mode selecting unit 210, the entropy encoding unit 230 may perform entropy encoding by the existing coding method. Further, the current input result can correspondingly update the details of the partitioning and prediction mode table about the number of times of using the string, the substitution of a new entry, or the like.

Figure 9:
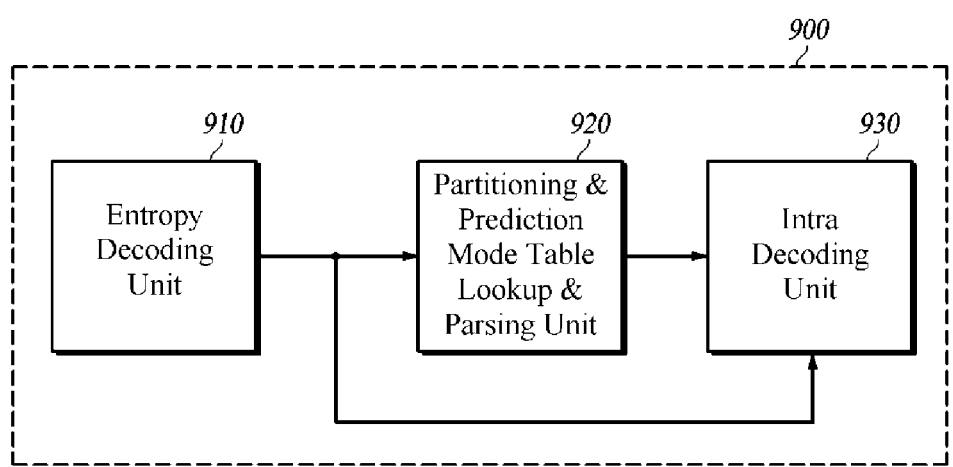
FIG. 9 is a schematic diagram of an additional intra-information decoding apparatus according to at least one embodiment of the present disclosure.

FIG. 9 is a schematic diagram of an additional intra-information decoding apparatus according to at least one embodiment of the present disclosure. With reference to FIG. 9, an additional intra-information decoding apparatus 900 according to at least one embodiment of the present disclosure may include an entropy decoding unit 910, a partitioning and prediction mode table lookup and parsing unit 920 and an intra decoding unit 930. Other components of the additional intra-information decoding apparatus 900, such as the entropy decoding unit 910, the partitioning and prediction mode table lookup and parsing unit 920 and the intra decoding unit 930 are implemented by one or more processors and/or application-specific integrated circuits (ASICs).

The entropy decoding unit 910 may perform an entropy decoding based on a bitstream received from the encoder.

The partitioning and prediction mode table lookup and parsing unit 920 performs a table lookup through a partitioning and prediction mode table and parsing based on signals decoded by the entropy decoding unit 910 and generates a partitioning and prediction mode string accordingly. At this point, the partitioning and prediction mode table lookup and parsing unit 920 stores the same table (i.e., partitioning and prediction mode table) as the encoder does, and synchronizes the update status of the table with the table of the encoder, as described above. In addition, the partitioning and prediction mode table lookup and parsing unit 920 may be embodied so that the table is looked up and parsed only when the partitioning and prediction mode flag has been set up.

The intra decoding unit 930 performs the intra-mode decoding based on the partitioning and prediction mode string generated by the partitioning and prediction mode table lookup and parsing unit 920. For example, if the partitioning and prediction mode string is generated as illustrated in FIG. 4 by looking up the table, the intra mode as illustrated in FIG. 3 can be decoded by parsing information on the partitioning and prediction mode from the generated string.

If the partitioning and prediction mode flag is reset, the intra decoding unit 930 directly performs intra-mode decoding of the signals decoded by the entropy decoding unit 910.

Figure 10:
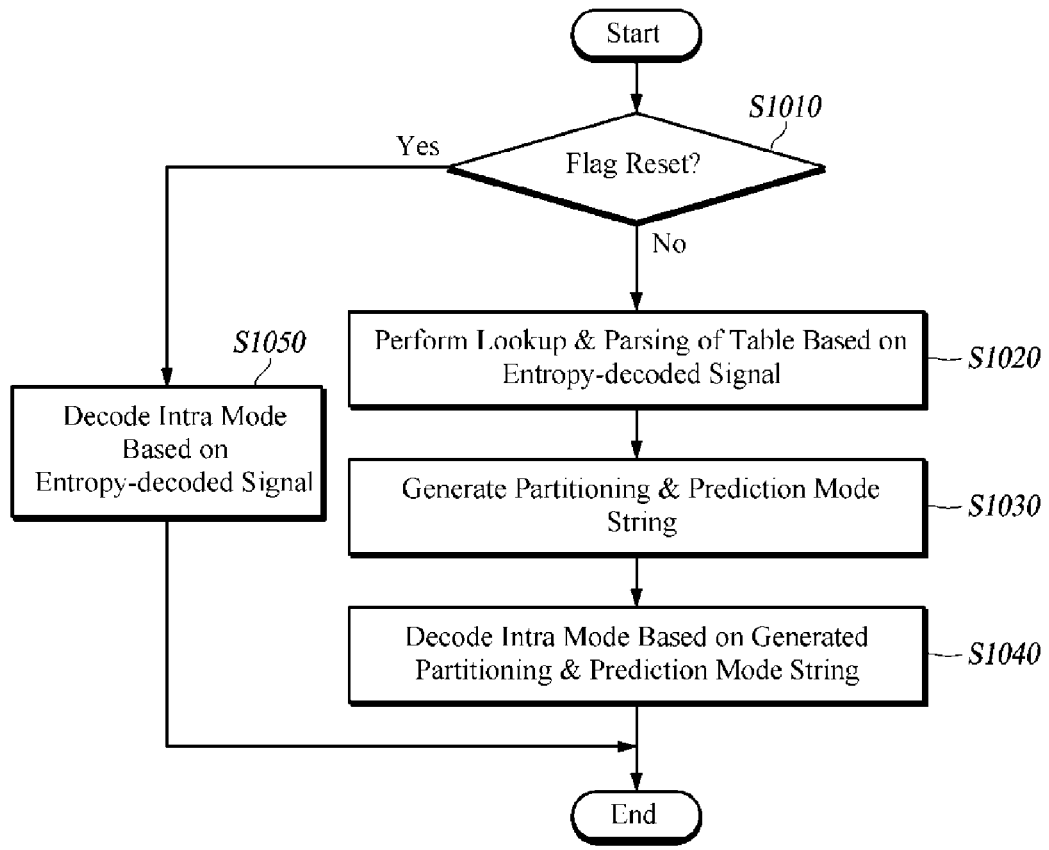
FIG. 10 is a flowchart of a method of decoding additional intra-information according to at least one embodiment of the present disclosure.

FIG. 10 is a flowchart of a method for decoding additional intra-information according to at least one embodiment of the present disclosure.

The entropy decoding unit 910 performs an entropy decoding based on the bitstream received from the encoder. Based on the signals decoded by the entropy decoding unit 910, if the partitioning and prediction mode flag is set (S1010), the partitioning and prediction mode table lookup and parsing unit 920 performs table lookup and parsing accordingly (S1020). At this point, if there is a signal identical to a decoded signal in the partitioning and prediction mode table, the partitioning and prediction mode table lookup and parsing unit 920 generates a partitioning and prediction mode string accordingly (S1030). At this point, it is desirable that the partitioning and prediction mode table lookup and parsing unit 920 stores the same table as in the encoder and synchronizes the update status of the table with the table of the encoder, as described above.

The intra decoding unit 930 performs an intra-mode decoding based on the partitioning and prediction mode string generated by the partitioning and prediction mode table lookup and parsing unit 920 (S1040).

If the signals decoded by the entropy decoding unit 910 represent that the partitioning and prediction mode flag is reset, the intra decoding unit 930 directly performs an intra-mode decoding based on the signals decoded by the entropy decoding unit 910 (S1050).

The at least one embodiment of the present disclosure is to effectively encode and/or decode additional intra-frame information due to ever-increasing sizes and resolutions of images in apparatuses for compressing video data and various methods of partitioning coding blocks. Further, according to at least one embodiment of the present disclosure, information amount at the time of encoding and/or decoding additional intra-information can be adaptively decreased by effectively managing partitioning information and prediction mode information patterns of previous blocks with a history table.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality. Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the explicitly described above embodiments but by the claims and equivalents thereof.

The invention claimed is:

1. An apparatus for encoding additional intra-information, the apparatus comprising:
    an intra prediction mode selecting unit, implemented by one or more processors, configured to
        select a partition type of a coding unit from among a plurality of partition types available to the coding unit, and
        select, when the coding unit is partitioned into first multiple subblocks based on the selected partition type, a prediction mode set of the first multiple of subblocks in the coding unit,
            wherein the selected prediction mode set includes a plurality of intra prediction modes, each of the plurality of intra prediction modes corresponds to each of the first multiple subblocks, and said each of the plurality of intra prediction modes is selected from among a plurality of intra prediction modes;
    a partitioning and prediction mode table lookup unit, implemented by one or more processors, configured to
        look up a table based on (i) the selected partition type and (ii) the selected prediction mode set,
            wherein the table stores a plurality of combination information items and a plurality of indexes, each of the plurality of indexes identifying each of the plurality of combination information items,
            wherein each of the plurality of combination information items indicates pattern information on (i) each partition type of a plurality of previously encoded coding units and (ii) a prediction mode set of second subblocks of one or more previously encoded coding units,
            wherein the second subblocks are partitioned from the one or more previously encoded coding units based on the said each partition type, the plurality of combination information items being stored according to the number of occurrence of the pattern information, and
        select, when the table includes a combination information item corresponding to (i) the selected partition type and (ii) the selected prediction mode set, the combination information item from among the plurality of combination information items; and
    an entropy encoding unit, implemented by one or more processors, configured to perform an encoding of an index of the plurality of indexes based on the selected combination information item, wherein the index of the plurality of indexes indicates the selected partition type and the selected prediction mode set.

2. The apparatus of claim 1, wherein the partitioning and prediction mode table lookup unit is configured to express the plurality of combination information items in a combined string format in the table.

3. The apparatus of claim 2, wherein the partitioning and prediction mode table lookup unit is configured to store the plurality of combination information items in different tables according to split depths of coding units.

4. An apparatus for decoding additional intra-information, the apparatus comprising:
an entropy decoding unit, implemented by one or more processors, configured to perform a decoding of an index based on a bitstream;
a partitioning and prediction mode table lookup and parsing unit, implemented by one or more processors, configured to
look up a table,
wherein the table stores a plurality of combination information items and a plurality of indexes, each of the plurality of indexes identifying each of the plurality of combination information items, the decoded index being one of the plurality of indexes,
wherein each of the plurality of combination information items indicates pattern information on (i) each partition type of a plurality of previously decoded coding units and (ii) a prediction mode set of second subblocks of one or more previously decoded coding units, the second subblocks being partitioned from the one or more previously decoded coding units based on the said each partition type, the plurality of combination information items being stored according to the number of occurrence of the pattern information,
select a combination information item from among the plurality of combination information items in the table based on the decoded index, the decoded index representing the combination information item among the plurality of combination information items,
reconstruct (i) a partition type of a coding unit to be decoded and (ii) a prediction mode set of first multiple subblocks in the coding unit, from the selected combination information item, the first multiple subblocks being partitioned from the coding unit based on the reconstructed partition type,
wherein the prediction mode set includes a plurality of intra prediction modes, each of the plurality of intra prediction modes corresponds to each of the first multiple subblocks, and said each of the plurality of intra prediction modes is selected from among a plurality of intra prediction modes, and
reconstruct said each of the plurality of intra prediction modes for said each of the first multiple subblocks based on the prediction mode set, from among the plurality of intra prediction modes; and
an intra decoding unit, implemented by one or more processors, configured to perform an intra-mode decoding of the first multiple subblocks, based on said each of the plurality of intra prediction modes for said each of the first multiple subblocks in the coding unit.

5. The apparatus of claim 4, wherein, the entropy decoding unit is further configured to decode a partitioning and prediction mode flag, and the partitioning and prediction mode table lookup and parsing unit is configured to determine, based on the decoded partitioning and prediction mode flag, whether the partitioning and prediction mode table lookup and parsing unit looks up the table.

6. The apparatus of claim 4, wherein the entropy decoding unit is further configured to decode a partitioning and prediction mode flag, and the intra decoding unit is configured to determine, based on the decoded partitioning and prediction mode flag, whether the intra-mode decoding is performed.

7. A method for encoding additional intra-information, the method performed by an apparatus for encoding additional intra-information and comprising:
selecting a partition type of a coding unit from among a plurality of partition types available to the coding unit;
selecting, when the coding unit is partitioned into first multiple subblocks based on the selected partition type, a prediction mode set of the first multiple subblocks in the coding unit,
wherein the prediction mode set includes a plurality of intra prediction modes, each of the plurality of intra prediction modes corresponds to each of the first multiple subblocks, and said each of the plurality of intra prediction modes is selected from among a plurality of intra prediction modes;
looking up a table based on (i) the selected partition type and (ii) the selected prediction mode set,
wherein the table stores a plurality of combination information items and a plurality of indexes, each of the plurality of indexes identifying each of the plurality of combination information items,
wherein each of the plurality of combination information items indicates pattern information on (i) each partition type of a plurality of previously encoded coding units and (ii) a prediction mode set of second subblocks of one or more previously encoded coding units,
wherein the second subblocks are partitioned from the one or more previously encoded coding units based on the said each partition type, the plurality of combination information items being stored according to the number of occurrence of the pattern information;
selecting, when the table includes a combination information item corresponding to (i) the selected partition type and (ii) the selected prediction mode set, the combination information item from among the plurality of combination information items; and
performing an encoding of an index of the plurality of indexes based on the selected combination information item, wherein the index of the plurality of indexes indicates the selected partition type and the selected prediction mode set.

8. The method of claim 7, wherein the looking up of the table comprises
expressing the plurality of combination information items in a combined string format in the table.

9. The method of claim 7, wherein the looking up of the table comprises
storing the plurality of combination information items in different tables according to split depths of coding units.

10. A method for decoding additional intra-information performed by an apparatus for decoding additional intra-information, the method comprising:
performing a decoding of an index based on a bitstream;
looking up a table,
wherein the table stores a plurality of combination information items and a plurality of indexes, each of the plurality of indexes identifying each of the plurality of combination information items, the decoded index being one of the plurality of indexes, wherein each of the plurality of combination information items indicates pattern information on (i) each partition type of a plurality of previously decoded coding units and (ii) a prediction mode set of second subblocks of one or more previously decoded coding units, the second subblocks being partitioned from the one or more previously decoded coding units based on the said each partition type, the plurality of combination information items being stored according to the number of occurrence of the pattern information;

selecting a combination information item from among the plurality of combination information items in the table based on the decoded index, the decoded index representing the combination information item among the plurality of combination information items;

reconstructing (i) a partition type of a coding unit to be decoded and (ii) a prediction mode set of first multiple subblocks in the coding unit from the selected combination information item, the first multiple subblocks being partitioned from the coding unit based on the reconstructed partition type, wherein the prediction mode set includes a plurality of intra prediction modes, each of the plurality of intra prediction modes corresponds to each of the first multiple subblocks, and said each of the plurality of intra prediction modes is selected from among a plurality of intra prediction modes;

reconstructing said each of the plurality of intra prediction modes for said each of the first multiple subblocks based on the extracted prediction mode set, from among the plurality of intra prediction modes; and performing an intra-mode decoding of the first multiple subblocks, based on said each of the plurality of intra prediction modes for said each of the first multiple subblocks in the coding unit.

11. The method of claim 10, wherein the performing of the decoding further comprises decoding a partitioning and prediction mode flag, and it is determined, based on the decoded partitioning and prediction mode flag, whether the looking up of the table
is performed.

12. The method of claim 10, wherein the performing of the decoding further comprises decoding a partitioning and prediction mode flag, and it is determined, based on the decoded partitioning and prediction mode flag, whether the performing of the intra-mode decoding is performed.

\* \* \* \* \*